April 18, 1961 E. SAUER ET AL 2,980,001
SINGLE OBJECTIVE MIRROR REFLEX CAMERAS
Filed Aug. 4, 1954 4 Sheets-Sheet 1
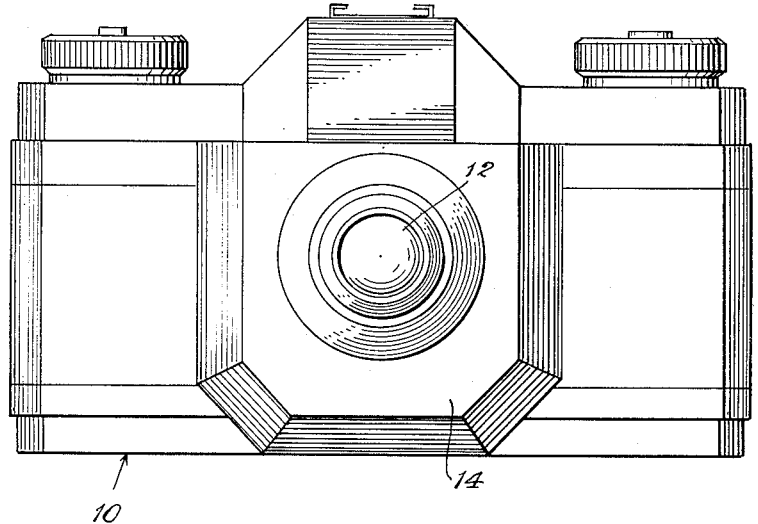
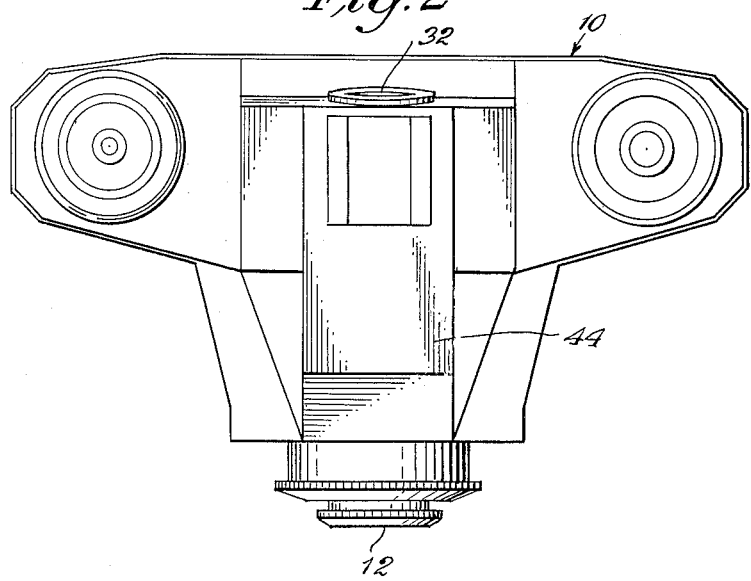
INVENTOR.
Edgar Sauer
Helmut Ebertz
By Singer, Stern & Carlberg
Attorneys April 18, 1961  E. SAUER ET AL  2,980,001
SINGLE OBJECTIVE MIRROR REFLEX CAMERAS
Filed Aug. 4, 1954  4 Sheets-Sheet 2
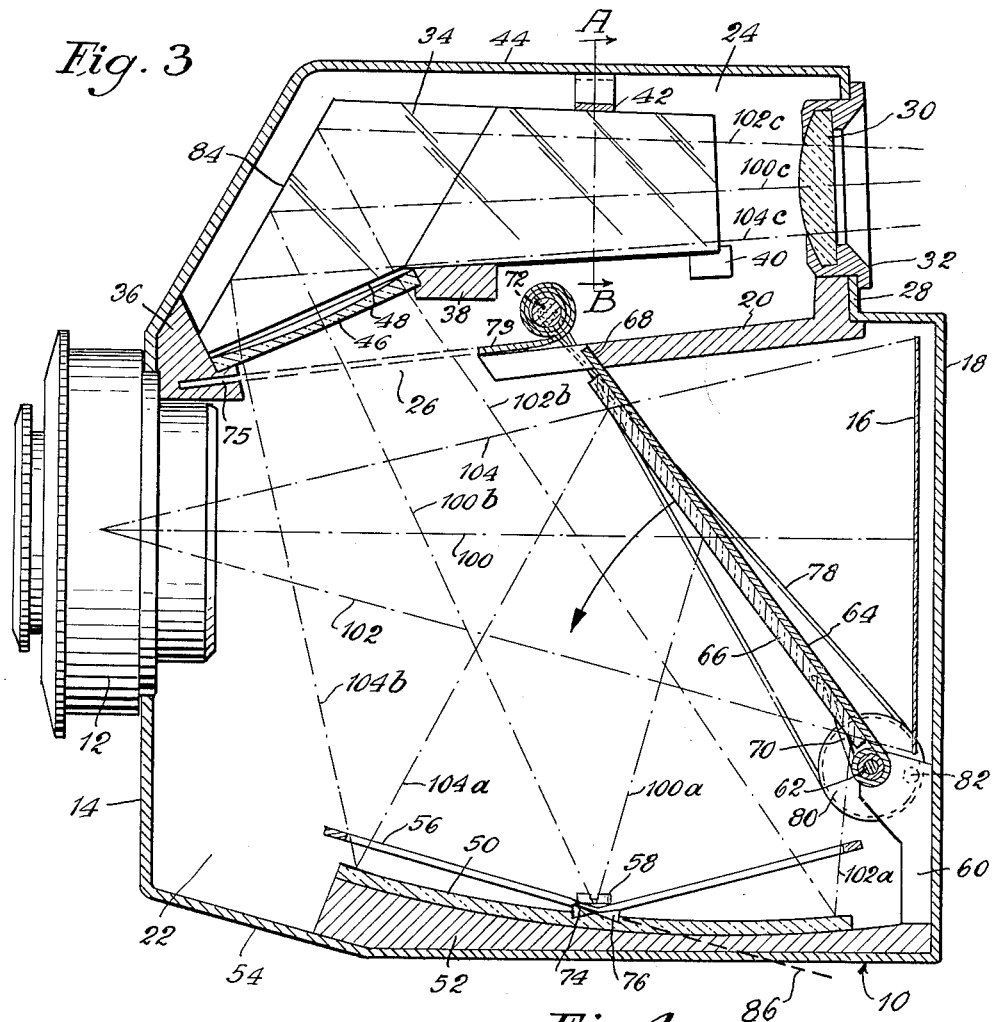
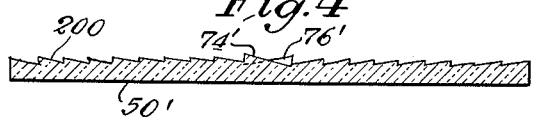
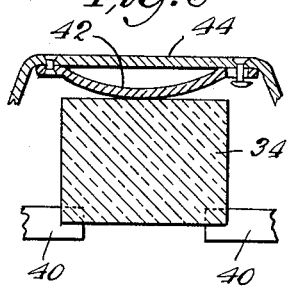
INVENTOR.
Edgar Sauer
Helmut Ebertz
By Singer, Stern & Carlberg
Attorneys April 18, 1961

E. SAUER ET AL 2,980,001

SINGLE OBJECTIVE MIRROR REFLEX CAMERAS

Filed Aug. 4, 1954

INVENTOR.
Edgar Sauer
Helmut Ebertz
By Singer, Stern & Carlberg
Attorneys

United States Patent Office 2,980,001
Patented Apr. 18, 1961

2,980,001

SINGLE OBJECTIVE MIRROR REFLEX CAMERAS

Edgar Sauer and Helmut Ebertz, Stuttgart, Germany, assignors to Zeiss Ikon A.G., Stuttgart, Germany Filed Aug. 4, 1954, Ser. No. 447,728

5 Claims. (Cl. 95—42)

The invention relates to a novel and improved photographic camera of the general type called reflex cameras.

Reflex cameras have several advantages but their widespread use has been prevented to a great extent due particularly to their bulkiness.

Accordingly, it is an important object of this invention to provide a reflex camera of a small size and of great compactness.

Another object of the invention is to provide a reflex camera of the type indicated in which the available space within the camera casing proper is efficiently utilized for housing the members reflecting the image admitted through the objective to the finder means and the eyepiece.

Still another object of the invention is to provide a reflex camera of the type indicated provided with a reflecting member mounted on the bottom wall of the camera casing in a position to reflect to the finder means an image admitted through the objective and reflected to said reflecting member by a mirror mounted in an inclined position within said casing.

A further object of the invention is to provide a reflex camera of the type indicated in which said inclined mirror is pivotally mounted so as to enable it to be moved on its pivots from its said inclined position to a position on top of said bottom reflecting member and entirely out of the way of the light-rays entering through the objective.

Another object of the invention is to provide a reflex camera of the type indicated having improved reflecting surfaces.

Still another object of the invention is to provide a reflex camera of the type indicated provided with means for light-sealingly separating the finder means from the objective and the light-reflecting members at the time of the exposure.

A further object of the invention is to provide a reflex camera of the type indicated having means operatively connecting said inclined mirror with said means for separating the finder means in order to provide for coordinated movements of said mirror and separating means.

Other objects and advantages of the invention will become evident from the following description with reference to the accompanying drawings in which:

Fig. 1 is a front view of an embodiment of the invention;

Fig. 2 is a top view of the same camera;

Fig. 3 shows a vertical section through the camera on the optical axis of the objective;

Fig. 4 shows in cross-section an embodiment of one of the reflecting members in the camera;

Fig. 5 is a fractional top view of an image limiting frame employed in the embodiment shown in Fig. 3;

Fig. 6 is a section on the line A—B in Fig. 3;

Figure 7:
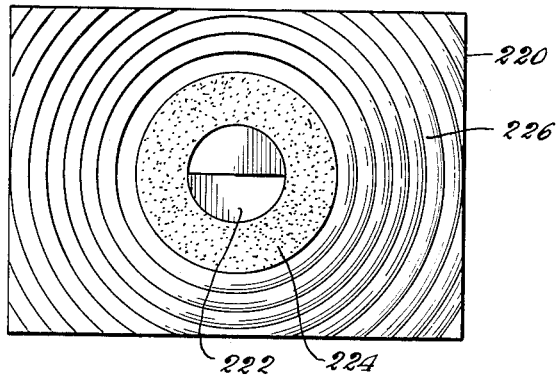
Figs. 7 and 8 show in plan view and in cross-section, respectively, a detail of an improved finder means for the camera according to the invention.

In the embodiment of the invention shown in Figs. 1–6, a camera casing 10 is provided with an objective 12 in its front wall 14. A light-sensitive member (film) is indicated at 16 close to the rear wall 18 of the casing 10. A partition 20 of non-transparent material divides the casing 10 into two chambers 22 and 24, the last-mentioned disposed above the chamber 22. Said partition 20 is provided with an aperture 26 in its front part for a purpose to be explained below. In the rear wall 28 of the top chamber 24 is a lens 30 mounted in a fitting 32 and serving as an eyepiece, as also explained below.

In the chamber 24, a prism 34 of irregular shape is mounted on supports 36, 38 and 40 against which supports the prism 34 is held by a yielding clip 42 secured to the top wall 44 of said chamber 24 as indicated in Figs. 3 and 6. A lens 46 is mounted on the supports 36 and 38 parallel with one side 48 of the prism 34.

A concave light-reflecting member 50 is mounted on a support 52 secured to the bottom wall 54 of the chamber 22. Above said member 50, a frame 56 of non-transparent resilient material is disposed and secured to the support 52 by means of screws 58. Brackets, one of which is shown at 60, at the rear lower part of the wall 18 support a horizontal shaft 62 on which is mounted a substantially flat member 64 serving as backing for a light-reflecting member 66 which is urged against the edge 68 of the partition 20 by means of a spring 70 attached to the shaft 62. A second horizontal shaft 72 is mounted on said partition 20 adjacent said edge 68 of the partition 20, and on said shaft 72 a non-transparent shade 73 of flexible material is windable, said shade being slidable in guides, not shown, to a position in which its front edge enters a slot 75 in the support 36. An endless cord 78 is mounted on said shaft 72 and around a pulley 80 on the shaft 62, as shown. A pin 82 on said pulley 80 serves a purpose to be explained below. Said cord 78 is crossed as indicated so as to cause the shafts 62 and 72 to rotate in opposite directions, when caused to rotate. The shaft 72 is operatively connected with the shutter mechanism (not shown) of the camera in a manner to be explained below.

A sharpness indicator consisting of two prism members 74, 76, which are wedge-shaped in cross-section, is mounted in the center of the light-reflecting member 50 and have surfaces which are also light-reflecting. The wedge-shaped members 74, 76 are mounted with their sharp edges adjoining, as will be further explained below.

In operation, when an exposure is to be made, the camera is directed in a known manner with the objective 12 towards the view to be photographed. The light-rays entering through the objective 12 pass through the chamber 22 to the light-reflecting member 66, a center ray 100 and two fringe rays 102, 104 being indicated by dash-dot lines in Fig. 3. The rays are reflected by the member 66 to the light-reflecting member 50, the particular rays mentioned above being marked 100a, 102a, and 104a, respectively.

From the concave light-reflecting member 50 said rays are reflected through the lens 46 and the prism 34 to the front reflecting surface 84 of said prism as rays 100b, 102b, and 104b, respectively. Finally, the rays are reflected by said surface 84 as rays 100c, 102c, and 104c, respectively, through the rear part of the prism 34 and the eyepiece 30 to the operator's eye. Obviously, therefore, the operator will see an image of the view caught by the objective 12 and will be able to adjust his own position and that of the camera as well as the setting of the objective as desired.

The necessary adjustments having been made, the operator actuates the trigger operating the shutter in any well known manner. Through the abovementioned mechanism (not shown) said actuation of the shutter trigger first rotates the shaft 72 in a clockwise direction, thereby causing the free edge of the shade 73 to move towards the slot 75 and at the same time, through the intermediary of the cord 78, causing rotation of the pulley 80 in a counter-clockwise direction. Approximately at the time when the free edge of the shade 73 is about to enter the slot 75, the rotation of the pulley 80 has progressed to a point, where the pin 82 engages the rear side of the member 64 and the continued rotation of the pulley 80, while the free edge of the shade 73 approaches the bottom of the slot 75, causes the members 64 and 66 to turn on the shaft 62 against the action of the spring 70, until said members 64, 66 engage the frame 56 which, due to its resiliency, serves to dampen the impact of the members 64, 66 thereon.

In this position of the parts, the chamber 22 is tightly sealed to all light, the space between the objective 12 and the light-sensitive film 16 is unobstructed, and exposure follows. Winding of the film 16 to place another portion thereof in position for exposure causes return of the movable parts to the position shown in Fig. 3.

In the structure and operation of the camera with an improved viewfinder thus generally described, the properties and arrangement of certain of the details are of particular importance for the achievement of a good result. First, the purpose of making the reflecting surface of the member 50 concave is to decrease the cross-sectional area of the bundle of rays 100b, 102b, 104b, etc., which reaches the surface 84. The lens 46 contributes to the same effect, and the ultimate reason for thus narrowing down the bundle of rays is to enable the dimensions of the chamber 24 to be kept at a minimum or, in other words, to decrease the size of the viewfinder.

This result can, however, be obtained by other means than the curved mirror 50, one of said other means being illustrated in Fig. 4. The member 50' shown in Fig. 4 is provided with a clear reflecting surface which is stepped as indicated at 200. Preferably, the steps 200 cover the entire area of the member 50' except a central field which comprises a sharpness indicator 74', 76' similar to the one shown in Fig. 3. The portions 200 and 74', 76' are suitably made in one piece and produced by casting in a single glass mold. A reflecting member of this type produces in the eyepiece 30 a very clear image of the view caught by the objective 12 and the central field reflected from the area 74', 76' provides an excellent means for focusing the picture properly.

Further means for obtaining a similar result are illustrated, partly diagrammatically, in Figs. 9–12. In this embodiment, the member 50 of Fig. 3 is replaced by a member 50''. The camera casing has been omitted in these illustrations and the objective 12'' and film 16'' are indicated by straight lines. Details corresponding to details of Fig. 3 are indicated by the same reference marks with the addition of a double prime.

The member 50'' consists of a plano-convex lens 200 having a convex reflecting (mirror) surface and being combined with a glass wedge 202, as shown. The sharpness indicator 74'', 76'', as in the case of Fig. 3, is located in the convex surface of the lens 200 and in the point of intersection between the reflecting surface of the lens 200 and the center ray 100'' of the objective 12'' after its reflection by the member 66 and deflection by the prism 202. The frame 56'' may be placed directly on the prism 202, as shown. In this embodiment, the theoretical image plane is represented by the line 86'' while, without the prism 202, it would have been represented by the line 86a. The principal advantage of this arrangement is that it does not cause any distortion of the image transmitted to the viewer since, contrary to what is the case in Fig. 3, said theoretical image does not cross the reflecting surface of the lens (or mirror) 200, said theoretical image in Fig. 3 being indicated by the dotted line 86.

Figure 9:
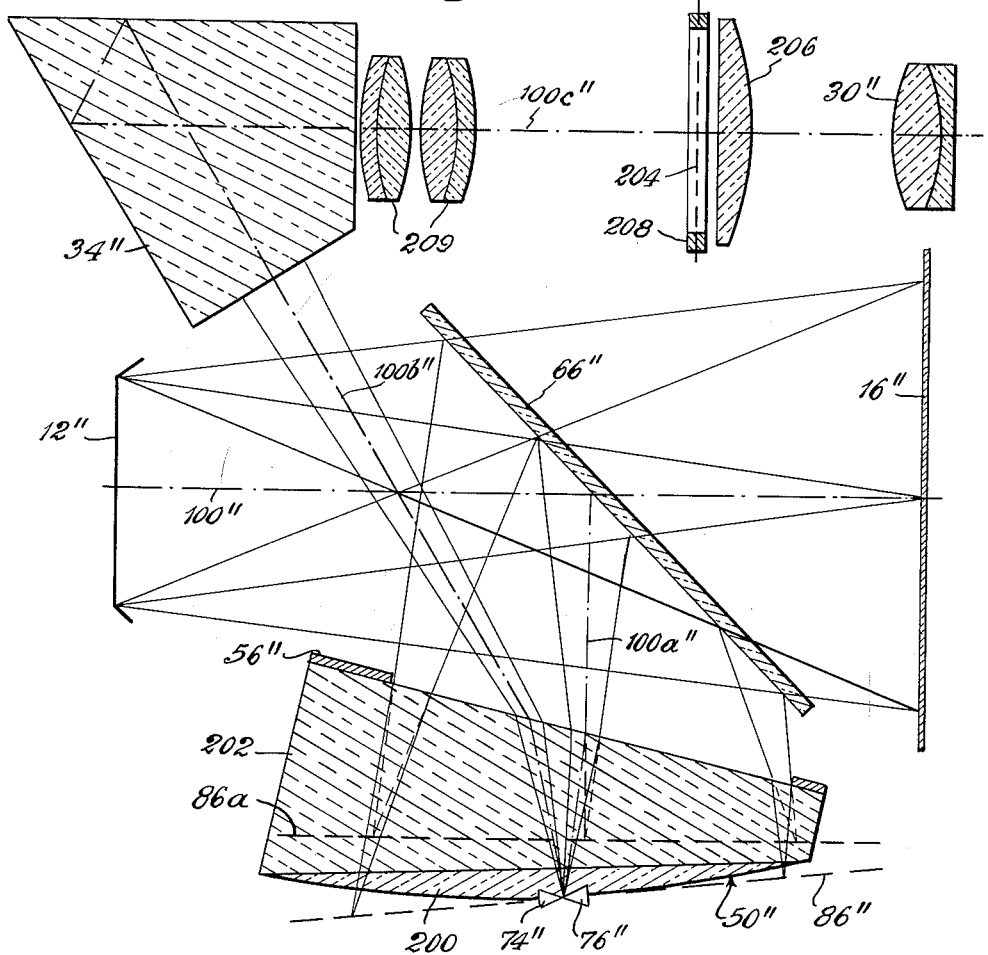
Fig. 9 is a diagrammatic view similar to Fig. 3 of a modified embodiment of the invention and with the camera casing and the mechanical operating means omitted, and, Figs. 10–12 shows sectional views of modified lens systems in the finder means.
Figure 10:
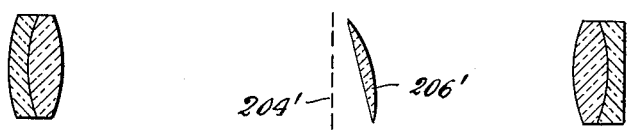

The embodiment of Fig. 9 also includes a modified viewer system. Instead of the roof-edge prism 34 of Fig. 3 a prism 34'' of the shape indicated in Fig. 9 is used. The path of the center ray 100'' is also indicated in said Fig. 9. It will be obvious that, contrary to the prism 34, said prism 34'' does not cause either lateral or vertical reversal of the image and, therefore, it becomes necessary to employ a special lens system 209 which produces an intermediate image in the plane 204. An intermediary lens 206 and an eyepiece 30'' form part of the viewer system. An image limiting frame 208 may be placed in the image plane 204 and used instead of or in addition to the frame 56 or 56''.

In this connection it may be pointed out that it is a well known fact that the framing of the image in the eyepiece is sharper and more distinct the closer the plane of the frame is to the plane of the image seen in the viewer. This viewer image lies in the case of Fig. 3 in the plane 86, i.e. a portion of it lies in front of the concave mirror 50, while another portion (dotted line) lies behind said mirror. In other words, the viewer image is "bent" approximately as the frame 56 in Fig. 3 and said "bent" shape of the viewer image is the reason for the bent shape of said frame 56. In the case of Fig. 9, the viewer image is not "bent" but straight, as indicated by the dotted line 86'' and, consequently, no bent frame is required but the straight frame 56'' may be disposed as shown. Naturally, it would also be possible to accomplish the image limitation by other means, such as a frame on the member 66.

The "bent" character of the viewer image in Fig. 3 could also be expressed so that one half of the image is slightly enlarged, while the other half is slightly decreased in size, an effect which is similar to that obtained, for example, when high buildings are photographed with a camera held at an angle to the horizontal plane. In the reproduction of such pictures, said effect can be neutralized by inclining the negative in relation to the reproduction paper in opposite direction. A similar correction can be obtained in the present camera having a viewer system of the type shown in Fig. 9 in combination with a concave mirror as 50, by inclined mounting or arrangement of the field lens 206 as indicated diagrammatically at 206' in Fig. 10.

Figure 11:
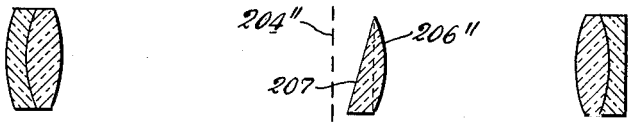
Figure 12:
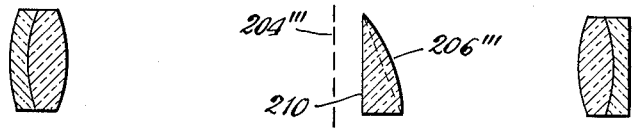

Another way of accomplishing the same result is indicated diagrammatically in Fig. 11, where the field lens 206'' is combined with a prism 207 similarly to the members 200 and 202 in Fig. 9. A still further modification for the same purpose is indicated in Fig. 12 in which the field lens 206'' is mounted in an inclined position and combined with a prism 210 having its front surface perpendicular to the optical axis of the viewer system.

Figure 8:
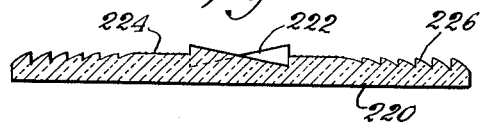

In a viewer system having means for producing an intermediary image, such as the system shown in Fig. 9, it is sometimes advantageous to dispose the sharpness indicator in said intermediary image plane 204, in addition to the image limiting means 208. A particularly advantageous device for such arrangement is illustrated in Figs. 7 and 8. In this embodiment, a glass member 220 is provided with a central field, preferably circular and comprising two wedge-shaped members arranged similarly to the members 74, 76 of Fig. 3.

Surrounding said central field 222 is a second central field 224 which is matted. Outside said second field 224, the member has a stepped surface 226, as indicated. The member 200 can be made integral with the wedges 222, or said wedges can form separate pieces, as desired.

In the viewer, this member produces an image the uniform brightness of which is interrupted by the somewhat darker surface of the matted field 224 only, but without impairing the impression of the total image. The device utilizes the known advantages of the central sharpness indicator and the matted surface while eliminating their separate disadvantages.

It is believed that the foregoing description conveys a good understanding of the objects and advantages of our invention. The appended claims have been drawn to cover all legitimate modifications and changes.

What we claim is:

1. In a single objective mirror reflex camera, the combination with a camera casing having a front wall, a rear wall and a bottom wall, of a photographic objective mounted in said front wall, a sensitized film arranged closely adjacent and parallel to said rear wall, a totally reflecting mirror mounted for pivotal movement within said camera casing and spaced rearwardly of said photographic objective and in front of said film, means for pivotally supporting said totally reflecting mirror at its lower end about a horizontal axis beneath the optical axis of the camera and at the lower portion of said rear wall, means for holding said mirror in its operative position which is inclined to said bottom wall so that the image projected by said objective into the camera is deflected downwardly towards the bottom of said camera casing, a substantially horizontal partition in said camera casing for dividing the latter into upper and lower chambers, said partition having a relatively small aperture at its front portion adjacent the front wall of the camera casing, a horizontal rotatable shaft with a flexible shade wound thereon mounted on said partition, said shade when being unwound closing said aperture in said partition, a view finder device arranged in the upper one of said chambers, a viewing aperture for the view finder device arranged in said rear wall, a substantially horizontally positioned light reflecting member mounted fixedly on the bottom wall of said camera casing and arranged at such an angle to the bottom wall to reflect the image projected by said photographic objective onto said pivotally mounted totally reflecting mirror upwardly and rearwardly past said mirror and through the aperture in said partition into said view finder device, said view finder device including a prism for receiving the image from said light reflecting member and for reflecting it substantially horizontally into said viewing aperture, and means for rotating first said rotatable shaft with the shade thereon for causing said shade to unwind and close said aperture in said horizontal partition and then for rotating said totally reflecting mirror about its pivot axis in a direction in which said mirror is moved downwardly to cover said light reflecting member and to expose the film to the image projected by said objective.

2. In a single objective mirror reflex camera, the combination with a camera casing having a front wall, a rear wall and a bottom wall, of a photographic objective mounted in said front wall, a sensitized film arranged closely adjacent and parallel to said rear wall, a totally reflecting mirror mounted for pivotal movement within said camera casing and spaced in rear of said photographic objective and in front of said film, a rotatable horizontal shaft on which the lower end of said totally reflecting mirror is fixedly mounted extending transversely and offset beneath the optical axis of said camera, bearing means for said horizontal shaft arranged at the lower portion of said rear wall, means for holding said mirror in its operative position inclined to said bottom wall so that the image projected by said objective into the camera is deflected downwardly towards the bottom of said camera casing, a substantially horizontal partition in said camera casing for dividing the latter into upper and lower chambers, said partition having a relatively small aperture at its front portion adjacent the front wall of the camera casing, a horizontal rotatable shaft with a flexible shade wound thereon mounted on said partition, said shade when being unwound closing said aperture in said partition, a view finder device arranged in the upper chamber, a viewing aperture for the view finder device arranged in said rear wall, a substantially horizontally positioned light reflecting member having a curved reflecting surface mounted fixedly on the bottom wall of said camera casing and arranged to reflect the image projected by said photographic objective onto said pivotally mounted totally reflecting mirror upwardly and rearwardly past said mirror and through the aperture in said partition into said view finder device, said view finder device including a prism for receiving the image from said light reflecting member and for reflecting it substantially horizontally into said viewing aperture, and means for rotating first said rotatable shaft with the shade thereon for causing said shade to unwind and close said aperture in said horizontal partition and then for rotating said other horizontal shaft in a direction in which said totally reflecting mirror is moved downwardly to cover said light reflecting member and to expose the film to the image projected by said objective.

3. In a single objective mirror reflex camera, the combination with a camera casing having a front wall, a rear wall and a bottom wall, of a photographic objective mounted in said front wall, a sensitized film arranged closely adjacent and parallel to said rear wall, a totally reflecting mirror mounted for pivotal movement within said camera casing and spaced in rear of said photographic objective and in front of said film, a rotatable horizontal shaft on which the lower end of said totally reflecting mirror is fixedly mounted with its axis of rotation transverse and offset beneath the optical axis of said camera objective, bearing means for said horizontal shaft arranged at the lower portion of said rear wall, means for holding said mirror in its operative position which is inclined to said bottom wall so that the image projected by said objective into the camera is deflected downwardly towards the bottom of said camera casing, a substantially horizontal partition in said camera casing for dividing the latter into upper and lower chambers, said partition having a relatively small aperture at its front portion adjacent the front wall of the camera casing, a horizontal rotatable shaft with a flexible shade wound thereon mounted on said partition, said shade when being unwound closing said aperture in said partition, a view finder device arranged in the upper chamber, a viewing aperture for the view finder device arranged in said rear wall, a substantially horizontally positioned light reflecting member mounted fixedly on the bottom wall of said camera casing and arranged to reflect the image projected by said photographic objective onto said pivotally mounted totally reflecting mirror upwardly and rearwardly past said mirror and through the aperture in said partition into said view finder device, said light reflecting member having an upwardly facing concave reflecting surface for concentrating the light rays reflected upwardly and rearwardly and into said view finder device, said view finder device including a prism for receiving the image from said light reflecting member and for reflecting it substantially horizontally into said viewing aperture, and means for rotating first said rotatable shaft with the shade thereon for causing said shade to unwind and close said aperture in said horizontal partition and then for rotating said other horizontal shaft in a direction in which said totally reflecting mirror is moved downwardly to cover said light reflecting member and to expose the film to the image projected by said objective, said totally light reflecting mirror being arranged such as to permit unobstructed passage of the image from said camera objective onto said film when moved to its inoperative position.

4. In a single objective mirror reflex camera, the combination with a camera casing having a front wall, a rear wall and a bottom wall, of a photographic objective mounted in said front wall, a sensitized film arranged closely adjacent and parallel to said rear wall, a totally reflecting mirror mounted for pivotal movement within said camera casing and spaced in rear of said photographic objective and in front of said film, a rotatable horizontal shaft on which the lower end of said totally reflecting mirror is fixedly mounted with its axis of rotation offset beneath the optical axis of said camera objective, bearing means for said horizontal shaft arranged at the lower portion of said rear wall, means for holding said mirror in its operative position inclined to said bottom wall so that the image projected by said objective into the camera is deflected downwardly towards the bottom of said camera casing, a substantially horizontal partition in said camera casing for dividing the latter into upper and lower chambers, said partition having a relatively small aperture at its front portion adjacent the front wall of the camera casing, a view finder device arranged in the upper chamber, a viewing aperture for the view finder device arranged in said rear wall, a substantially horizontally positioned light reflecting member mounted fixedly on the bottom wall of said camera casing and arranged to reflect the image projected by said photographic objective onto said pivotally mounted totally reflecting mirror upwardly and rearwardly past said mirror and through the aperture in said partition into said view finder device, said view finder device including a prism for receiving the image from said light reflecting member and for reflecting it substantially horizontally into said viewing aperture, and means for rotating said horizontal shaft in a direction in which said totally reflecting mirror is moved downwardly to cover said light reflecting member and to expose the film to the image projected by said objective, said last mentioned means including a second rotatable shaft mounted on said partition and arranged parallel to said first mentioned rotatable shaft, a flexible shade mounted on said shaft and adapted to close said aperture in said partition when said totally reflecting mirror is moved to a position to expose said film and when said second rotatable shaft is rotated in one direction and to uncover said aperture when said second rotatable shaft is rotated in the opposite direction to swing said totally reflecting mirror into its operative position, and a drive connection between said two shafts arranged in such a manner that said pivotally mounted mirror is caused to be moved downwardly immediately after said shade has closed said aperture in said partition.

5. In a single objective mirror reflex camera, the combination with a camera casing having a front wall, a rear wall and a bottom wall, of a photographic objective mounted in said front wall, a sensitized film arranged closely adjacent and parallel to said rear wall, a totally reflecting mirror mounted for pivotal movement within said camera casing and spaced rearwardly of said photographic objective and in front of said film, a rotatable horizontal shaft on which the lower end of said totally reflecting mirror is fixedly mounted, bearing means for said horizontal shaft arranged at the lower portion of said rear wall to permit said shaft to swing about an axis offset and beneath the axis of said camera objective, means for holding said mirror in its operative position which is inclined to said bottom wall so that the image projected by said objective into the camera is deflected downwardly towards the bottom of said camera casing, a substantially horizontal partition in said camera casing for dividing the latter into upper and lower chambers, said partition having a relatively small aperture at its front portion adjacent the front wall of the camera casing, a horizontal rotatable shaft with a flexible shade wound thereon mounted on said partition, said shade when being unwound closing said aperture in said partition, a view finder device arranged in the upper chamber, a viewing aperture for the view finder device arranged in said rear wall, a substantially horizontally positioned light reflecting member mounted fixedly on the bottom wall of said camera casing and inclined relative to the bottom wall to reflect the image projected by said photographic objective onto said pivotally mounted totally reflecting mirror upwardly and rearwardly past said mirror and through the aperture in said partition into said view finder device, said totally reflecting mirror being arranged to swing to a position in which the film is exposed and the reflecting member is covered to permit unobstructed passage of the objective image onto said film, said view finder device including a prism for receiving the image from said light reflecting member and for reflecting it substantially horizontally into said viewing aperture, means for rotating first said rotatable shaft with the shade thereon for causing said shade to unwind and close said aperture in said horizontal partition and then for rotating said other horizontal shaft in a direction in which said totally reflecting mirror is moved downwardly to cover said light reflecting member and to expose the film to the image projected by said objective, and a frame of non-transparent material forming an image area limiting member secured on top of said fixedly mounted light reflecting member and adapted to dampen the impact of the pivotally mounted totally reflecting mirror when the latter is moved downwardly.

References Cited in the file of this patent

UNITED STATES PATENTS

| 1,963,107 | Walters | June 19, 1934 |
| 2,350,793 | Mihalyi | June 6, 1944 |
| 2,521,790 | Haesler | Sept. 12, 1950 |
| 2,526,204 | Dodin | Oct. 17, 1950 |

FOREIGN PATENTS

| 15,199 | Great Britain | 1907 |
| 681,928 | Great Britain | Oct. 29, 1952 |
| 1,012,436 | France | Apr. 16, 1952 |

OTHER REFERENCES

Ser. No. 304,702, Kuppenbender (A.P.C.), published May 4, 1943.